US009238336B2

(12) United States Patent
Ishibashi et al.

(10) Patent No.: US 9,238,336 B2
(45) Date of Patent: Jan. 19, 2016

(54) PROCESS AND APPARATUS FOR PRODUCING SHEET-SHAPED PREPREG

(75) Inventors: Soichi Ishibashi, Nagoya (JP); Kazuaki Funada, Tokyo (JP); Shinya Takeuchi, Otsu (JP); Tamotsu Suzuki, Otsu (JP); Rinako Eto, Nagoya (JP); Masayoshi Morihara, Nagoya (JP); Takeru Sasaki, Nagoya (JP); Eisuke Wadahara, Nagoya (JP); Yasumoto Noguchi, Otsu (JP)

(73) Assignee: Toray Industries, Inc. (JP)

( * ) Notice: Subject to any disclaimer, the term of this patent is extended or adjusted under 35 U.S.C. 154(b) by 406 days.

(21) Appl. No.: 13/806,356

(22) PCT Filed: Jun. 29, 2011

(86) PCT No.: PCT/JP2011/064884
§ 371 (c)(1),
(2), (4) Date: Dec. 21, 2012

(87) PCT Pub. No.: WO2012/002417
PCT Pub. Date: Jan. 5, 2012

(65) Prior Publication Data
US 2013/0106014 A1     May 2, 2013

(30) Foreign Application Priority Data
Jun. 30, 2010 (JP) ................................. 2010-149295

(51) Int. Cl.
*B29B 11/16* (2006.01)
*B29C 70/50* (2006.01)
(Continued)

(52) U.S. Cl.
CPC .............. *B29C 70/50* (2013.01); *B29B 15/125* (2013.01); *C08J 5/24* (2013.01); *B29K 2105/0872* (2013.01)

(58) Field of Classification Search
CPC ...... B29B 11/00; B29B 15/12; B29B 15/122; B29B 15/14; B29C 43/52; B29C 67/14; B29C 67/00; B29C 45/14; B29C 70/50; B29C 53/8066; B29C 70/00
USPC .......................... 264/257, 259, 1.28, 136, 160
See application file for complete search history.

(56) References Cited

U.S. PATENT DOCUMENTS 3,992,240 A * 11/1976 Kuehn, Jr. ...................... 156/250
5,277,566 A *  1/1994 Augustin et al. ............... 425/114
(Continued)

FOREIGN PATENT DOCUMENTS

| JP | 60-036136 | | 2/1985 |
|----|-----------|---|--------|
| JP | 05-0116142 | * | 5/1993 |

(Continued)

*Primary Examiner* — Alison Hindenlang
*Assistant Examiner* — Jerzi H Moreno Hernandez
(74) *Attorney, Agent, or Firm* — DLA Piper LLP (US)

(57) ABSTRACT

A process for producing a sheet-shaped prepreg includes: a fiber bundle introduction step in which tape-shaped reinforcing fiber bundles are disposed in a multilayer arrangement in the thickness direction and introduced into a die to which a molten thermoplastic resin has been supplied; a fiber bundle thickness reduction step in which each of the tape-shaped reinforcing fiber bundles is widened by means of spreading to reduce the thickness; a resin impregnation step in which the tape-shaped reinforcing fiber bundles are impregnated with the molten resin in the die; and a lamination step in which the plurality of resin-impregnated tape-shaped reinforcing fiber bundles are laminated in the die.

25 Claims, 4 Drawing Sheets

(51) Int. Cl.
*C08J 5/24* (2006.01)
*B29B 15/12* (2006.01)
*B29K 105/08* (2006.01)

(56) References Cited

U.S. PATENT DOCUMENTS

| | | | |
|---|---|---|---|
| 7,344,667 B2* | 3/2008 | Honma et al. | 264/136 |
| 7,888,274 B2* | 2/2011 | Tsuji et al. | 442/59 |
| 2006/0137156 A1* | 6/2006 | Kawabe et al. | 28/271 |
| 2007/0126142 A1* | 6/2007 | Zhou et al. | 264/134 |
| 2008/0233380 A1* | 9/2008 | Hiel et al. | 428/299.4 |
| 2009/0271960 A1* | 11/2009 | Kawabe et al. | 28/283 |
| 2009/0291278 A1* | 11/2009 | Kawabe et al. | 428/213 |
| 2010/0068518 A1* | 3/2010 | Honma et al. | 428/401 |
| 2010/0215887 A1* | 8/2010 | Kawabe | 428/56 |
| 2012/0135227 A1* | 5/2012 | Kawabe | 428/338 |
| 2013/0295806 A1* | 11/2013 | Imai et al. | 442/59 |
| 2013/0327479 A1* | 12/2013 | Ichino et al. | 156/307.3 |
| 2014/0106166 A1* | 4/2014 | Nelson et al. | 428/367 |

FOREIGN PATENT DOCUMENTS

| | | | | |
|---|---|---|---|---|
| JP | 05-116142 | | 5/1993 | |
| JP | 05116142 | * | 5/1993 | B29B 11/16 |
| JP | 07-040341 | | 2/1995 | |
| JP | 08-281645 | | 10/1996 | |
| JP | 9-111644 | | 4/1997 | |
| JP | 2000-355629 | | 12/2000 | |
| JP | 2001-162689 | | 6/2001 | |
| JP | 2001-262443 | | 9/2001 | |
| JP | 2002-363855 | | 12/2002 | |
| JP | 2005-029912 | | 2/2005 | |
| JP | 2005-325191 | | 11/2005 | |
| JP | 2008-230236 | | 10/2008 | |
| JP | 2010270420 A | * | 12/2010 | |

* cited by examiner

PROCESS AND APPARATUS FOR PRODUCING SHEET-SHAPED PREPREG

RELATED APPLICATIONS

This is a §371 of International Application No. PCT/JP2011/064884, with an international filing date of Jun. 29, 2011 (WO 2012/002417 A1, published Jan. 5, 2012), which is based on Japanese Patent Application No. 2010-149295, filed Jun. 30, 2010, the subject matter of which is incorporated herein by reference.

TECHNICAL FIELD

This disclosure relates to process and apparatus for producing a sheet-shaped prepreg and, specifically, to a process and apparatus for producing a sheet-shaped prepreg using continuous reinforcing fibers into which a resin is extremely uniformly impregnated.

BACKGROUND

A sheet-shaped prepreg, wherein a molten matrix resin is impregnated into reinforcing fibers arranged in a sheet-like form and the resin is maintained at a semi-cured condition, is utilized broadly in various fields for reinforcing a component, forming a surface, etc. Further, to obtain excellent reinforcement advantage, etc., continuous fibers are frequently used as reinforcing fibers, and in particular, a prepreg, in which continuous reinforcing fibers are arranged in a tape-shaped form, for example, in one direction, and a resin is impregnated thereinto, is preferably employed (for example, JP_A_60-36136).

When such a sheet-shaped prepreg is prepared by a molten resin impregnation process, if a resin which has a high melt viscosity such as a thermoplastic resin is employed as the matrix resin, there is a case that is difficult to impregnate the molten resin satisfactorily all over through the cross section of the tape-shaped reinforcing fiber bundle formed by arranging the continuous reinforcing fibers. Especially, when the thickness of the tape-shaped reinforcing fiber bundle is greater than a certain level, a predetermined impregnation becomes difficult, and a good-quality impregnation form (prepreg sheet) cannot be obtained.

In the case where a material prepared by not continuous reinforcing fibers but, for example, by compounding short fibers of reinforcing fibers randomly in a resin, is employed, although it is possible to form a sheet-shaped base material with reinforcing fibers and resin distributed uniformly by kneading and compounding, etc., in such a manner, a high strength of a molded product and a reinforcing effect such as those achieved in case using continuous reinforcing fibers cannot be expected.

In the case where a molten resin is impregnated into ravings (each having a circular or elliptical cross section) comprising long fibers for reinforcing fibers, it is known that the molten resin impregnating ability into portions between long fibers is improved by spreading each raving (for example, JP-A-2005-29912), and that the molten resin impregnating ability into portions between long fibers is improved by sucking air between long fibers forming the roving (for example, JP-A-5-116142). In JP '142, the rovings are drawn into a die after dividing them one by one. This technology, however, in the case of a tape-shaped reinforcing bundle of continuous reinforcing fibers, when the thickness becomes greater than a certain level, because the resin impregnating ability mainly depends on the viscosity of the molten resin, a high impregnation ability improvement effect cannot be expected. Further, with respect to the resin impregnation time affecting the productivity, for the roving having a circular or elliptical cross section, because the resin impregnation time is regulated by a time for the resin to impregnate from all directions, it is not necessary to improve the impregnation ability in a specified direction, and it is considered that the above-described air suction from the inside of the roving contributes to improve impregnation ability. However, in the case of a tape-shaped reinforcing fiber bundle wherein the thickness is much smaller than the width, because the completion time for the resin impregnation is regulated by the time for resin impregnation in the thickness direction, to attempt to shorten the resin impregnation time, thereby improving the productivity, not only simply performing the spreading fibers, but also a special device to improve the resin impregnation ability in the thickness direction are required.

Except the above-described technologies, in the case where a plurality of roving arranged in parallel are impregnated, it is known that rovings adjacent to each other are alternately divided into separate groups so as not to prevent fiber spreading and particle-like resin is given to them (for example, JP-A-040341). In that technology, however, the rovings are in a condition of being divided into groups when the particle-like resin is supplied into the ravings, and when resin impregnation is actually performed, they are handled as an integral sheet and not divided into groups. Therefore, this technology does not satisfactorily shorten the resin impregnation time in the thickness direction.

Furthermore, to control the cross-sectional shape and gain a flat plane of an obtained sheet-shaped prepreg, it is known to use a pair of vertically arranged convexo-concave rolls (calendar rolls) (for example, JP-A-2000-355629). In that technology, however, only widening by convexo-concave rolls is disclosed, and a necessary factor for the strict control of the constant sheet width, with respect to narrowing after widening in width, is not disclosed at all, and therefore, it is not a satisfactory technical content.

Accordingly, in view of the above-described circumstances, it could be helpful to produce a high-grade sheet-shaped prepreg at a high productivity.

SUMMARY

We provide a process for producing a sheet-shaped prepreg including:

a fiber bundle introduction step that arranges tape-shaped reinforcing fiber bundles, each including a plurality of continuous reinforcing fibers, in a multilayer form in a thickness direction of each tape-shaped reinforcing fiber bundle, while running the tape-shaped reinforcing fiber bundles continuously, and introducing them into a die to which a molten thermoplastic resin has been supplied;

a fiber bundle thickness reduction step that widens each of the tape-shaped reinforcing fiber bundles arranged in the multilayer form by spreading to reduce a thickness of each tape-shaped reinforcing fiber bundle, at one or both of stages before and after the introduction into the die;

a resin impregnation step that impregnates the molten thermoplastic resin into each of the tape-shaped reinforcing fiber bundles reduced in thickness in the die; and a lamination step that laminates a plurality of tape-shaped reinforcing fiber bundles, into which the molten thermoplastic resin is being impregnated or/and into which the molten thermoplastic resin has been impregnated, in the die, and wherein a prepreg having a sheet shape as its whole shape is produced.

We also produce an apparatus for producing a shoot-shaped prepreg having a sheet shape including:

a die supplied with a molten thermoplastic resin;

a fiber bundle introducer that arranges tape-shaped reinforcing fiber bundles, each including a plurality of continuous reinforcing fibers, in a multilayer form in a thickness direction of each tape-shaped reinforcing fiber bundle, while running the tape-shaped reinforcing fiber bundles continuously, and introducing them into the die;

a fiber bundle thickness reducer that widens each of the tape-shaped reinforcing fiber bundles arranged in the multilayer form by spreading to reduce a thickness of each tape-shaped reinforcing fiber bundle, at one or both of stages before and after the introduction into the die;

a resin impregnator that impregnates the molten thermoplastic resin into each of the tape-shaped reinforcing fiber bundles reduced in thickness in the die; and a laminator that laminates a plurality of tape-shaped reinforcing fiber bundles into which the molten thermoplastic resin is being impregnated or/and into which the molten thermoplastic resin has been impregnated, in the die.

EXPLANATION OF SYMBOLS

Figure 1:
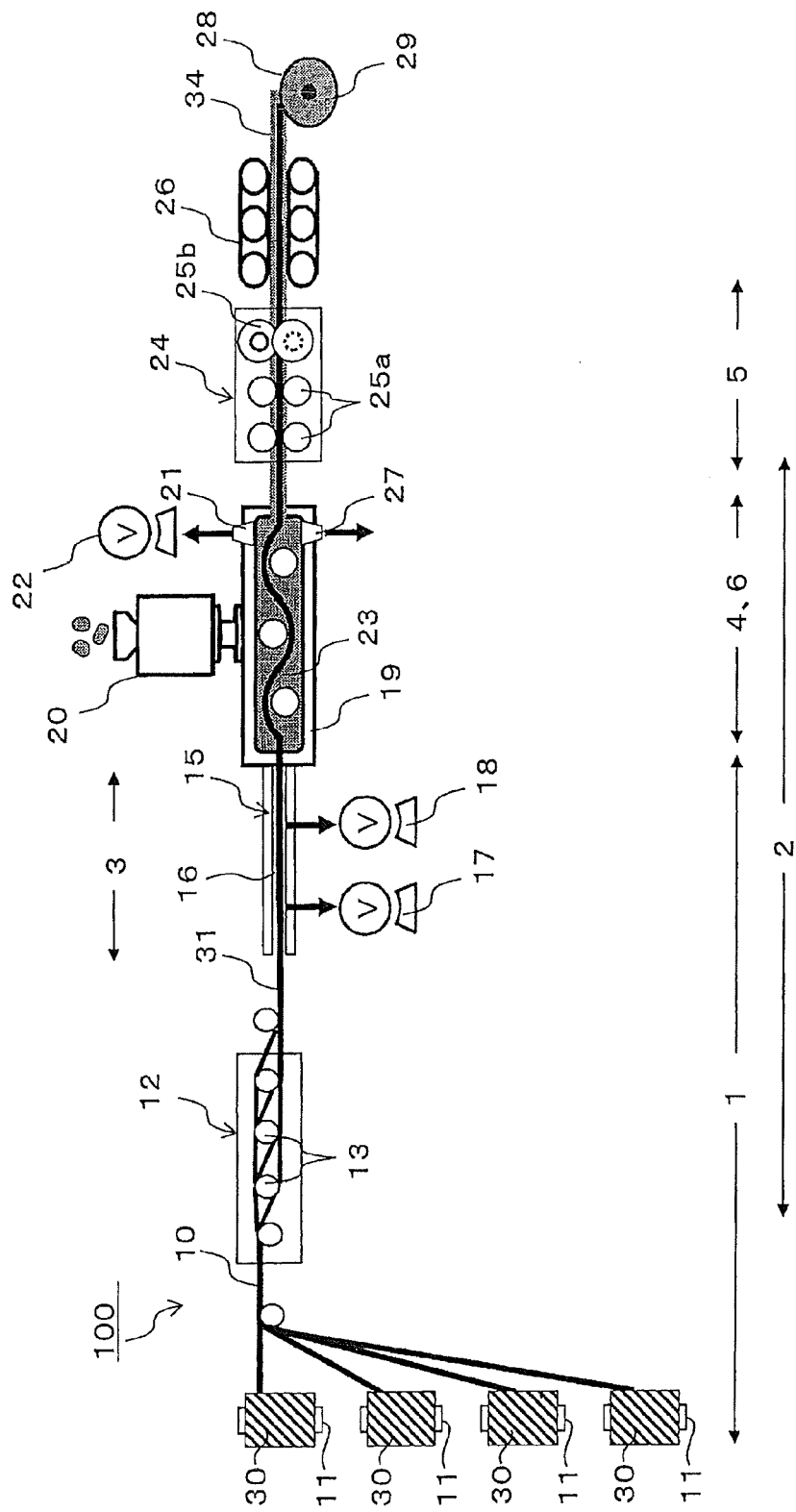
FIG. 1 is a schematic diagram showing process and apparatus for producing a sheet-shaped prepreg according to an example.

1: fiber bundle introduction step (fiber bundle introduction means)
2: fiber bundle thickness reduction step (fiber bundle thickness reduction means)
3: degas step (degas means)
4: resin impregnation step (resin impregnation means)
5: post-impregnation step (post-Impregnation means)
6: lamination step (lamination means)
10: tape-shaped reinforcing fiber bundle
11: creel
12: spreader
13: spreading roll
15: vacuum seat means
16: passageway
17, 18, 22: vacuum pump
19: die
20: extruder
21: degas vent
23: molten resin
24: calendar roll
25a: first calendar roll
25b: second calendar roll
26: tractor
27: resin bleed vent
28: winder
29: prepreg roll
30: continuous reinforcing fiber
31: widened tape-shaped reinforcing fiber bundle
32: guide bar
33a, 33b: fixed guide
34: sheet-shaped prepreg
35: tunnel
100: apparatus for producing a sheet shaped prepreg

DETAILED DESCRIPTION

Our process for producing a sheet-shaped prepreg comprises:

a fiber bundle introduction step for arranging tape-shaped reinforcing fiber bundles, each comprising a plurality of continuous reinforcing fibers, in a multilayer form in a thickness direction of each tape-shaped reinforcing fiber bundle, while running the tape-shaped reinforcing fiber bundles continuously, and introducing them into a die to which a molten thermoplastic resin has been supplied;

a fiber bundle thickness reduction step for widening each of the tape-shaped reinforcing fiber bundles arranged in the multilayer form by means of spreading to reduce a thickness of each tape-shaped reinforcing fiber bundle, at one or both of stages before and after the introduction into the die;

a resin impregnation step for impregnating the molten thermoplastic resin into each of the tape-shaped reinforcing fiber bundles reduced in thickness in the die; and a lamination step for laminating a plurality of tape-shaped reinforcing fiber bundles, into which the molten thermoplastic resin is being impregnated or/and into which the molten thermoplastic resin has been impregnated, in the die, and wherein a prepreg having a sheet shape as its whole shape is produced.

In this process for producing a sheet-shaped prepreg, the tape-shaped reinforcing fiber bundle comprising continuous reinforcing fibers is spread and widened at one or both of stages before and after the introduction into the die, using means of spreading such as air, ironing or vibration at the stage before the introduction and using means of spreading such as ironing at the stage after the introduction, and whereby the thickness of each tape-shaped reinforcing fiber bundle is reduced. Namely, even in the case where a thermoplastic resin having a relatively high melt viscosity is used, the thickness is reduced to be capable of impregnating the resin sufficiently and satisfactorily in a short period of time. Then, a plurality of tape-shaped reinforcing fiber bundles, each reduced in thickness are used, and at a condition where these tape-shaped reinforcing fiber bundles are arranged in a multilayer form in the thickness direction, the molten resin having been supplied is impregnated into the respective tape-shaped reinforcing fiber bundles in the die. Since each tape-shaped reinforcing fiber bundle is formed as a sheet-like material small in thickness, the molten resin is easily impregnated into each tape-shaped reinforcing fiber bundle for the small distance in the thickness direction (impregnation distance) and, therefore, a uniform impregnation is performed all through the desired thickness direction in a short period of time. A plurality of respective tape-shaped reinforcing fiber bundles into which the molten resin is being impregnated or/and in which the impregnation has been completed, are laminated in the thickness direction in the same die, and a sheet-shaped prepreg is formed to become a target thickness in total. In this sheet-shaped prepreg, since the time required for resin impregnation for each tape-shaped reinforcing fiber bundle may be short, the prepreg can be prepared in a short time only summing up the time required for the resin impregnation and the time required for the lamination successively performed in the same die, the productivity can be remarkably enhanced from the viewpoint of the time for production. Further, even after completion of the sheet-shaped prepreg, laminating the resin-impregnated tape-shaped reinforcing fiber bundles, the arrangement of the reinforcing fibers in the prepreg can be kept in a uniform and good condition, since the thickness of the tape-shaped reinforcing fiber bundle can be easily uniformed at the stage of spreading and widening of each tape-shaped reinforcing fiber bundle, in particular, the thickness of the tape-shaped reinforcing fiber bundle can be easily uniformed at the stage of spreading and widening of each tape-shaped reinforcing fiber bundle before resin impregnation, and the continuous reinforcing fibers can also be easily arranged uniformly. In addition, since the molten resin has been uniformly impregnated into the respective tape-shaped reinforcing fiber bundles laminated as described above, the obtained sheet-like prepreg becomes a high-grade one which has uniform properties all over through.

In the process for producing a sheet-shaped prepreg above-described, a thermoplastic resin is used for the above-mentioned molten resin. Namely, as described above, because our process is more effective to a resin with high melt viscosity than to a resin with low melt viscosity, it is particularly effective for the case using a thermoplastic resin. The kind of thermoplastic resin used is not particularly limited, such as polyamide (nylon 6, nylon 66, aromatic polyamide, polyolefin (polyethylene, polypropylene, etc.) polyester (polyethylene terephthalate, polybutylene terephthalate, etc.), polycarbonate, polyamideimide, polyphenylene sulfide, polyphenylene oxide, polysulfone, polyethersulfone, polyetheretherketone, polyetherketoneketone, polyketone, polyimide, polyetherimide, polystyrene, ABS, liquid crystalline polyester, and copolymer of acrylonitrile and styrene, etc. can be used. A mixture thereof may be used. Further, a copolymer such as a copolymerized nylon of nylon 6 and nylon 66 may be used. In particular, using polyphenylene sulfide, polyetheretherketone, polyetherketoneketone, polyetherimide or aromatic polyamide is a preferable embodiment in the present invention, because of the enhanced necessity for using continuous reinforcing fibers that exhibit an excellent reinforcement effect. Moreover, according to required properties of the molded product to be obtained, flame retardant, weather resistance improvement agent, and the other antioxidant, thermal stabilizer, ultraviolet absorbent, plasticizer, lubricant, colorant, compatibilizer, conductive filler, etc. may be added.

Further, the kinds of the above-described continuous reinforcing fiber is also not particularly limited, any reinforcing fibers such as carbon fiber, glass fiber or aramid fiber can be used, and a hybrid structure combining these fibers can also be employed. In particular, in case where the mechanical properties of a final molded product such as strength are desired to be increased, carbon fiber is preferred to use. Among carbon fiber, use of carbon fiber having a high strength which hardly generate fuzz in the fiber bundle thickness reduction step or the resin impregnation step, is further preferred. In concrete terms, it indicates carbon fibers having tensile strength of 4,500 MPa or more, and further, 5,000 MPa or more. Further, for a sizing agent, provided to the reinforcing fibers, use of one having 5% or less thermal reduction at 300° C. is preferred. More preferably, sizing agent having 15% or less thermal reduction at 350° C. When using a sizing agent which hardly thermally decompose, fuzz are hardly generated in the fiber bundle thickness reduction step or the resin impregnation step, and as generation in the die can be minimized, and the advantages according to the present invention can be exhibited to the maximum. Such advantages can be remarkably exhibited particularly in a heat-resistant thermoplastic resin which processing temperature is around 300° C. or higher (for example, polyphenylene sulfide, polyetheretherketone, polyetherketoneketone, polyetherimide or aromatic polyamide). In the case where carbon fiber with no sizing agent provided is used, although there is a merit that gas generation almost disappears, fuzz generation is remarkable, and there is a case where it is not only unable to obtain a high-grade sheet-shaped prepreg but also the difficulty to realize a high productivity. The above-described thermal reduction means a rate of reduction of a sizing agent at each temperature of 300° C. and 150° C. when heated under an atmospheric condition from 25° C. to 400° C. at a temperature elevation speed of 10° C./min, in thermo-gravimetric analysis.

In the above-described process for producing a sheet-shaped prepreg, the above-described tape-shaped reinforcing fiber bundles arranged in the multilayer form can be disposed at a formation of a plurality of steps in which a gap is given between adjacent tape-shaped reinforcing fiber bundles, in the thickness direction of each tape-shaped reinforcing fiber bundles, at one or both of stages before and after the introduction into the die. In such a manner, since the molten resin is impregnated at a condition where an adequate gap is provided between the respective tape-shaped reinforcing fiber bundles disposed at a formation of a plurality of steps, the molten resin is impregnated more easily into each tape-shaped reinforcing fiber bundle from the both surface sides by a small distance (impregnation distance) in the thickness direction. Therefore, a desired uniform impregnation is completed in a shorter period of time, and the productivity is further improved.

Further, in the process for producing a sheet-shaped prepreg, each of the above-described tape-shaped reinforcing fiber bundles arranged in the multilayer form can be formed by adjoining smaller-width tape-Shaped reinforcing fiber bundles to one another in a width direction of each smaller-width tape-shaped reinforcing fiber bundle. For example, in the case where the width of the sheet-shaped prepreg to be produced is greater than a width of each of a tape-shaped reinforcing fiber bundle which is usually prepared, such a manner can be employed. Namely, a plurality of smaller-width tape-shaped reinforcing fiber bundles are adjoined to one another until becoming a predetermined width in a width direction (that is, until substantially becoming a width of a sheet-shaped prepreg to be produced), and after they are formed as a formation of a tape-shaped reinforcing fiber bundle with a predetermined wide width, the resin can be impregnated into the wide-width tape-shaped reinforcing fiber bundle. In such a manner, a sheet-shaped prepreg having a wide width can be produced easily and efficiently. Further, in the case where the above-described tape-shaped reinforcing fiber bundles with smaller-width are adjoined to one another in a width direction to form a predetermined large-width tape-shaped reinforcing fiber bundle, in the fiber introduction step for introduction into the die, a gap can be given in the width direction between the adjacent smaller-width tape-shaped reinforcing fiber bundles. By providing a gap between the above-described adjacent smaller-width tape-shaped reinforcing fiber bundles, in the resin impregnation step in the die, it becomes possible to ventilate air efficiently, which has been carried into the die by the tape-shaped reinforcing fiber bundles, through the gap from an entrance of the die or a degas vent, described later, to the outside of the die, and the influence of the air preventing the resin impregnation can be minimized.

Further, in the process for producing a sheet-shaped prepreg, it is preferred to have a seal section capable of reducing the pressure of chamber of passageway to predetermined vacuum degree is connected to a portion directly upstream relative to the fiber bundle introduction step above-described, and a degas step is provided wherein a pressure reduction degree in each of the tape-shaped reinforcing fiber bundles arranged in the multilayer form is enhanced by passing each of the tape-shaped reinforcing fiber bundles arranged in the multilayer form through the chamber of the passageway reduced in pressure at the predetermined vacuum degree. In such a manner, the amount of air carried into the die by the tape-shaped reinforcing fiber bundles can be minimized, and it becomes possible to maintain the molten resin impregnation performance into the tape-shaped reinforcing fiber bundles at a good condition.

Further, in the above-described fiber bundle thickness reduction step, positions for widening tape-shaped reinforcing fiber bundles adjacent to each other among the tape-shaped reinforcing fiber bundles arranged in the multilayer form by spreading may be shifted to each other in a running direction of the tape-shaped reinforcing fiber bundles. In such a manner, it becomes possible to dispose respective fiber bundle thickness reduction means easily at desired positions without interference with each other, and a desired operation can be carried out more securely for each tape-shaped reinforcing fiber bundle which is one of the targets of thickness reduction and widening.

Further, in the above-described resin impregnation step, a manner can also be employed wherein positions for impregnation or completion of impregnation of the molten thermoplastic resin into respective tape-shaped reinforcing fiber bundles are shifted in order in a running direction of the tape-shaped reinforcing fiber bundles. In such a manner, it becomes possible to dispose respective resin impregnation means easily at desired positions without interference with each other, and a desired operation can be carried out more securely for each tape-shaped reinforcing fiber bundle which is one of the targets of resin impregnation.

Further, in the above-described lamination step, a manner can also be employed wherein a plurality of tape-shaped reinforcing fiber bundles being impregnated with the molten thermoplastic resin or/and having been impregnated with the molten thermoplastic resin are laminated in order at positions shifted in order in the running direction of the tape-shaped reinforcing fiber bundles. In such a lamination in order, it becomes possible to laminate the respective layers more surely and accurately, and improvement of the dimensional accuracy of the sheet-shaped prepreg as a laminate becomes possible.

Further, in the above-described die, a manner can also be employed wherein respective tape-shaped reinforcing fiber bundles are spread in order or/and respective tape-shaped reinforcing fiber bundles having been impregnated with the molten thermoplastic resin are laminated in order, using a plurality of fixed guides (for example, squeeze bars) arranged in a running direction of the tape-shaped reinforcing fiber bundles, and a tunnel for tape-shaped reinforcing fiber bundles is provided to each of at least a part of the plurality of fixed guides used for the spreading or/and the lamination and at least a part of tape-shaped reinforcing fiber bundles are run through the tunnels. Because there is a possibility that a large space may not be taken in the above-described die, it is preferred to use a fixed guide not requiring a large space for the spreading or/and the lamination in the die, and by arranging a plurality of fixed guides in the running direction of the tape-shaped reinforcing fiber bundles, it becomes possible to spread respective tape-shaped reinforcing fiber bundles in order or/and laminate respective tape-shaped reinforcing fiber bundles having been impregnated with the molten thermoplastic resin in order. Then, by providing the tunnels for tape-shaped reinforcing fiber bundles to each of at least a part of the plurality of fixed guides, with respect to a part of the tape-shaped reinforcing fiber bundles which have been already spread or/and laminated, it becomes possible to pass them through the tunnels without performing the operation of spreading or/and lamination, and it becomes possible to perform spreading or/and lamination at desirable positions in order.

Further, in the process for producing a sheet-shaped prepreg, in the above-described resin impregnation step, a manner can also be employed wherein impregnation or completion of impregnation of the molten thermoplastic resin into respective tape-shaped reinforcing fiber bundles is performed at a same position in a running direction of the tape-shaped reinforcing fiber bundles. Namely, the tape-shaped reinforcing fiber bundles arranged in a multilayer form can be impregnated with resin substantially simultaneously at a same position in the running direction. In such a manner, it may become possible to shorten the length of the die.

Further, in the above-described lamination step, it becomes possible to laminate a plurality of tape-shaped reinforcing fiber bundles being impregnated with the molten thermoplastic resin or/and having been impregnated with the molten thermoplastic resin simultaneously at a predetermined position in the running direction of the tape-shaped reinforcing fiber bundles.

Further, in the process for producing a sheet-shaped prepreg, in the above-described resin impregnation step or lamination step, it is preferred to ventilate gas and resin in the die from a degas vent and/or a resin bleed vent equipped to the die. Although the molten resin of a predetermined thermoplastic resin is supplied into the die, to achieve a smooth resin impregnation, it is preferred that gas generated inside and air carried in by the tape-shaped reinforcing fiber bundles and the like are ventilated from the degas vent. Further, it is preferred to bleed degraded molten resin, fuzz of the tape-shaped reinforcing fiber bundles, etc. from the resin bleed vent. If degraded molten resin, fuzz of the tape-shaped reinforcing fiber bundles, etc. are accumulated in the die, not only the grade of the sheet-shaped prepreg obtained is lowered, but also continuous driving performance in case of a long-time operation is damaged. Therefore, by bleeding degraded molten resin, fuzz of the tape-shaped reinforcing fiber bundles, etc. from the resin bleed vent, it becomes possible to obtain a higher-grade sheet-shaped prepreg as well as to perform a continuous long-time operation, and the productivity can also be improved.

Further, in the process for producing a sheet-shaped prepreg, a post-impregnation step can be provided wherein, after the prepreg laminated in the above-described die and formed as a sheet shape as its whole shape is pulled from the die, it is further passed through calender rolls. By employing the calendaring treatment by the calender rolls, post-impregnation of the resin becomes possible by pressing between the calendar rolls and it becomes possible to achieve a further satisfactory resin impregnated state, and because thickness adjustment by a small amount is possible, it becomes possible to make the thickness of a prepreg as a final product more precisely.

In the case where such a post-impregnation step is provided, it is possible to employ the above-described calender rolls comprising at least a first calender roll and a second calender roll, at least the second calender roll is a roll with a groove, and after the prepreg formed as a sheet shape is widened by passing it through the first calender roll, a width of the sheet-shaped prepreg is regulated to become a predetermined width in a width direction while narrowing in width the widened sheet-shaped prepreg, by passing it through the second calender roll. In such an example, by passing the prepreg through the first calender roll, it is slightly widened by pressing between rolls and a satisfactory resin impregnation state is achieved, and thereafter, by passing it through the second calender roll which is a roll with a groove of a predetermined width, the width of the sheet-shaped prepreg can be regulated to become a predetermined width while it is narrowed in width, and therefore, it becomes possible to make also the width of a prepreg as a final product more precisely.

An apparatus for producing a sheet-shaped prepreg is characterized in that a prepreg having a sheet shape as its whole shape is produced, and the apparatus comprises:

a die supplied with a molten thermoplastic resin;

a fiber bundle introduction means for arranging tape-shaped reinforcing fiber bundles, each comprising a plurality of continuous reinforcing fibers, in a multilayer form in a thickness direction of each tape-shaped reinforcing fiber bundle, while running the tape-shaped reinforcing fiber bundles continuously, and introducing them into the die;

a fiber bundle thickness reduction means for widening each of the tape-shaped reinforcing fiber bundles arranged in the multilayer form by means of spreading to reduce a thickness of each tape-shaped reinforcing fiber bundle, at one or both of stages before and after the introduction into the die;

a resin impregnation means for impregnating the molten thermoplastic resin into each of the tape-shaped reinforcing fiber bundles reduced in thickness in the die; and a lamination means for laminating a plurality of tape-shaped reinforcing fiber bundles, into which the molten thermoplastic resin is being impregnated or/and into which the molten thermoplastic resin has been impregnated, in the die.

Also, in this apparatus for producing a sheet-shaped prepreg, the kind of the thermoplastic resin used is not particularly limited, and thermoplastic resins similar to those aforementioned can be used. Further, the kind of the above-described continuous reinforcing fibers also is not particularly limited, reinforcing fibers similar to those aforementioned can be used, and in particular, in case where the mechanical properties of a final molded product such as strength are desired to be increased, use of carbon fibers is preferred. Also, with respect to the kind of sizing agent, sizing agents similar to those aforementioned can be used.

Further, in the apparatus for producing a sheet-shaped prepreg, an apparatus can be additionally employed wherein provided is means for disposing the above-described tape-shaped reinforcing fiber bundles arranged in the multilayer form at a formation of a plurality of steps, in which a gap is provided between adjacent tape-shaped reinforcing fiber bundles, in the thickness direction of each tape-shaped reinforcing fiber bundle at one or both of stages before and after the introduction into the die. Further, an apparatus can be additionally employed wherein the above-described each of the tape-shaped reinforcing fiber bundles arranged in the multilayer form is formed by adjoining smaller-width tape-shaped reinforcing fiber bundles to one another in a width direction of each smaller-width tape-shaped reinforcing fiber bundle. Further, in the case where the above-described smaller-width tape-shaped reinforcing fiber bundles are adjoined to one another to form a predetermined large-width tape-shaped reinforcing fiber bundle, in the fiber introduction step for introduction into the die, a gap can be given between the adjacent smaller-width tape-shaped reinforcing fiber bundles in the width direction of the large-width tape-shaped reinforcing fiber bundle. Further, an apparatus can also be additionally employed wherein a seal section capable of reducing in pressure a chamber of a passageway at a predetermined vacuum degree is connected to a portion immediately upstream relative to the fiber bundle introduction means, and a degas means is provided for enhancing a pressure reduction degree in each of the tape-shaped reinforcing fiber bundles arranged in the multilayer form by passing each of the tape-shaped reinforcing fiber bundles arranged in the multilayer form through the chamber of the passageway reduced in pressure at the predetermined vacuum degree.

Further, in the apparatus for producing a sheet-shaped prepreg, an apparatus can be additionally employed wherein, in the above-described fiber bundle thickness reduction means, positions for widening tape-shaped reinforcing fiber bundles adjacent to each other among the tape-shaped reinforcing fiber bundles arranged in the multilayer form by spreading are shifted to each other in a running direction of the tape-shaped reinforcing fiber bundles. Further, an apparatus can also be additionally employed wherein, in the above-described resin impregnation means, positions for impregnation or completion of impregnation of the molten thermoplastic resin into respective tape-shaped reinforcing fiber bundles are shifted in order in a running direction of the tape-shaped reinforcing fiber bundles. Further, an apparatus can be additionally employed wherein the lamination means comprises means for laminating a plurality of tape-shaped reinforcing fiber bundles being impregnated with the molten thermoplastic resin or/and having been impregnated with the molten thermoplastic resin in order at positions shifted in order in the running direction of the tape-shaped reinforcing fiber bundles.

Further, an apparatus can be additionally employed wherein a plurality of fixed guides (for example, squeeze bars) are arranged in the above-described die in a running direction of the tape-shaped reinforcing fiber bundles, the fixed guides being used for spreading respective tape-shaped reinforcing fiber bundles in order or/and laminating respective tape-shaped reinforcing fiber bundles having been impregnated with the molten thermoplastic resin in order, and tunnels for tape-shaped reinforcing fiber bundles capable of running at least a part of tape-shaped reinforcing fiber bundles through the tunnel is provided to each of at least a part of the plurality of fixed guides.

Further, an apparatus can also be additionally employed wherein the above-described resin impregnation means comprises means for performing impregnation or completion of impregnation of the molten thermoplastic resin into respective tape-shaped reinforcing fiber bundles at a same position in a running direction of the tape-shaped reinforcing fiber bundles. In this case, an apparatus can be additionally employed wherein the lamination means comprises means for laminating a plurality of tape-shaped reinforcing fiber bundles being impregnated with the molten thermoplastic resin or/and having been impregnated with the molten thermoplastic resin simultaneously at a predetermined position in the running direction of the tape-shaped reinforcing fiber bundles.

Further, in the apparatus for producing a sheet-shaped prepreg, an apparatus can be additionally employed wherein a degas vent and/or a resin bleed vent is equipped to the above-described die.

Further, an apparatus can be additionally employed wherein a post-impregnation means is provided which is disposed at a position downstream relative to the die and which has calender rolls performing calendaring treatment for the prepreg laminated in the die, formed as a sheet shape as its whole shape and pulled from the die. In this case, an apparatus can be additionally employed wherein the calender rolls comprise, at least, a first calender roll for widening the prepreg formed as a sheet shape to become a predetermined width in a width direction and a second calender roll with a groove disposed at a position downstream relative to the first calender roll for regulating the widened sheet-shaped prepreg to become a predetermined width in a width direction while narrowing in width the widened sheet-shaped prepreg.

In the process and apparatus for producing a sheet-shaped prepreg, a high-grade sheet-shaped thermoplastic prepreg, in which the resin has been uniformly and satisfactorily impregnated throughout the predetermined thickness and the reinforcing fibers also have been uniformly arranged, can be provided. Further, the time required for resin impregnation can be considerably shortened, and this high-quality sheet-shaped prepreg can be produced with a high productivity.

Hereinafter, desirable examples will be explained referring to the Drawings.

FIG. 1 shows a process and an apparatus for producing a sheet shaped prepreg according to an example, wherein symbol 100 indicates the whole of the apparatus for producing a sheet shaped prepreg. In this example, a fiber bundle introduction step (a fiber bundle introduction means) 1, a fiber bundle thickness reduction step (a fiber bundle thickness reduction means) 2, a degas step (a degas means) 3, a resin impregnation step (a resin impregnation means) 4, a lamination step (a lamination means) 6, and a post-impregnation step (a post-impregnation means) 5 are provided.

A plurality of reinforcing fiber bundles (tape-shaped reinforcing fiber bundles) 10, each comprising a plurality of continuous reinforcing fibers 30, are pulled out from respective creels 11, and sent to a spreader 12 provided as an example of a fiber bundle thickness reduction means for reducing the thickness of each fiber bundle by widening due to spreading. The spreader 12 may be one having an oven and accompanying heating as shown in the figure, and alternatively, may comprise directly heating spreading rolls 13. In the spreader 12, for example, the respective tape-shaped reinforcing fiber bundles 10 having been introduced are spread by a plurality of spreading rolls 13, etc. (or bars for spreading), they are widened by means of the spreading and the thickness of each tape-shaped reinforcing fiber bundle 10 is reduced.

Figure 2:
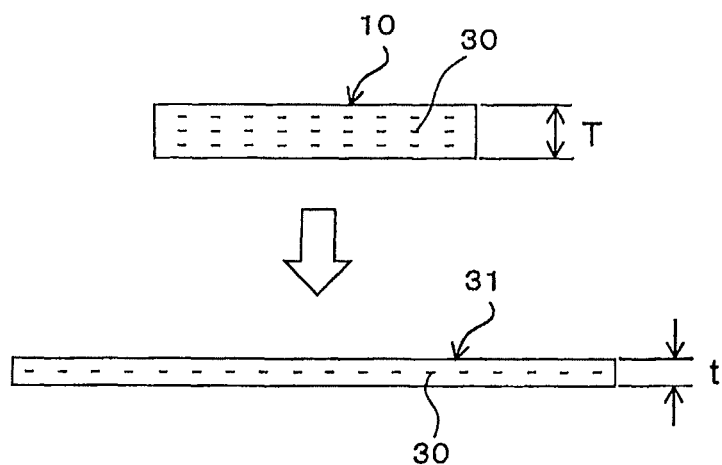
FIG. 2 is a schematic cross-sectional view of a tape-shaped reinforcing fiber bundle showing an example of widening by spreading in a process for producing a sheet-shaped prepreg.
Figure 3:
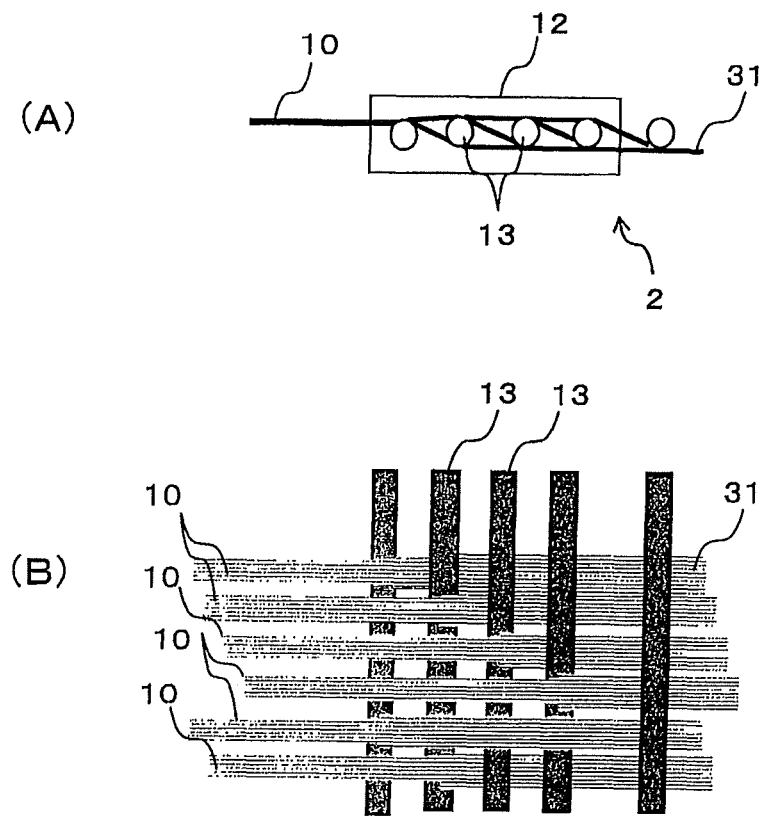
FIG. 3 depicts a schematic site view (A) and a schematic plan view (B) showing an example of spreading in a spreader of the apparatus shown in FIG. 1.

This spreading and widening is carried out, for example, in a manner such as an example shown in FIG. 2, an initial thickness T of the tape-shaped reinforcing fiber bundle 10 comprising the continuous reinforcing fibers 30 is reduced down to a thickness t by spreading and widening to achieve a formation of a thin widened tape-shaped reinforcing fiber bundle 31. In the case where the width of a sheet-shaped prepreg to be produced finally is greater than the width of this widened tape-shaped reinforcing fiber bundle 31, tape-shaped reinforcing fiber bundles may be adjoined in the width direction by a necessary number at the stage of the tape-shaped reinforcing fiber bundle 10 or at the stage of tape-shaped reinforcing fiber bundle 31. For example, as shown in FIG. 3, a plurality of tape-shaped reinforcing fiber bundles 10 having been run in parallel are widened by spreading rolls 13 at positions different from one another shifted in the running direction of the tape-shaped reinforcing fiber bundles 10, the plurality of widened tape-shaped reinforcing fiber bundles 10 are adjoined in the width direction to form the widened tape-shaped reinforcing fiber bundle 31 having a predetermined width and greater in width. Although not shown in FIG. 2, it is possible to perform such widening and adjoining in the width direction also in a die described later.

The tape-shaped reinforcing fiber bundles 31 each having been reduced in thickness by spreading and widening are introduced into a die 19 for resin impregnation, in this example, after passing through the degas step 3 as shown in FIG. 1, more concretely, via a vacuum seal means 15 as a degas means. In vacuum seal means 15, for example, a passageway 16, sealed from outside as much as possible and capable of passing with tape-shaped reinforcing fiber bundles 31, is formed, and air is sucked from a chamber in the formed the passageway 16 by a vacuum pump (in the example shown in the figure, two vacuum pumps 17, 18). As described later, in the resin impregnation step, to impregnate the resin uniformly and satisfactorily, it is preferred that the molten resin and the tape-shaped reinforcing fiber bundles are being brought into contact with each other for a long time. Namely, the inside of the die 19 for resin impregnation is preferably filled with the molten resin with mixed air and gas as less as possible, and if the tape-shaped reinforcing fiber bundles 31 carry a large amount of air into the die, because the direct contact between the molten resin and the tape-shaped reinforcing fiber bundles is damaged, and such a condition is not preferred. The amount of air carried in becomes greater as the production speed becomes higher, and it makes resin impregnation more difficult. By such a degas, the amount of air, which the tape-shaped reinforcing fiber bundles 31 carry into the die, can be minimized, the resin impregnation is facilitated, and the effect can be exhibited as much as possible.

A molten resin of a predetermined thermoplastic resin is supplied to the die 19 from an extruder 20 connected thereto, and it is preferred that gas generated inside, air carried in by the tape-shaped reinforcing fiber bundles 31, etc. are ventilated from a degas vent 21 by a vacuum pump 22 and the like. Further, it is also preferred to bleed out degraded molten resin, fizz of the tape-shaped reinforcing fiber bundles, etc. from a resin bleed vent 27. In the ease where degraded molten resin, fuzz of the tape-shaped reinforcing fiber bundles, etc. are accumulated in the die, not only the grade of the sheet-shaped prepreg obtained is lowered, but also continuous driving performance in case of a long-time operation is damaged. By bleeding degraded molten resin, fuzz of the tape-shaped reinforcing fiber bundles, etc. from such a resin bleed vent 27, it becomes possible not only to obtain a higher-grade sheet-shaped prepreg but also to realize a production capability of bearing a long-time operation. The impregnation of the molten resin 23 charged in the die 19 is performed, for example, as shown in FIG. 4 or FIG. 5.

Figure 4:
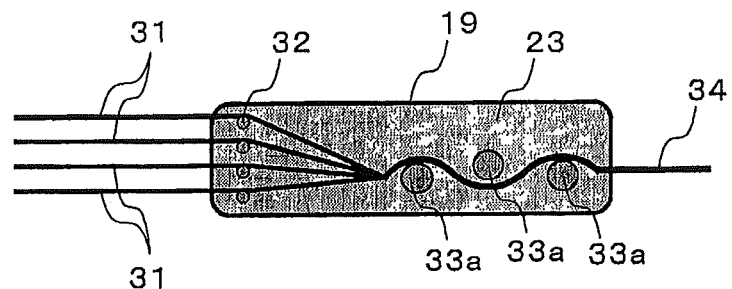
FIG. 4 is a schematic cross-sectional view of a die showing an example of introduction into the die and lamination in the die of tape-shaped reinforcing fiber bundles in a process for producing a sheet-shaped prepreg.

In the example shown in FIG. 4, the tape-shaped reinforcing fiber bundles 31 arranged in a multilayer form, each reduced in thickness by the above-described spreading and widening, are introduced into the die 19 supplied with the molten resin 23, at a condition where they are disposed at a formation of a plurality of steps (in the example shown in the figure, at four steps) in the thickness direction of each the tape-shaped reinforcing fiber bundles 31 and an adequate gap is given between adjacent tape-shaped reinforcing fiber bundles 31, in the example shown in FIG. 4, guide bars 32 for guiding respective tape-shaped reinforcing fiber bundles 31 are arranged at positions immediately after the introduction into the die 19 to maintain the above-described condition of a plurality of steps given with the gaps. Although respective tape-shaped reinforcing fiber bundles 31 having passed through the guide bars 32 are approached to each other to be laminated, because a condition given with a gap between adjacent tape-shaped reinforcing fiber bundles 31 is kept from the positions immediately after the introduction into the die 19 up to the position being laminated, each of the respective tape-shaped reinforcing fiber bundles 31 reduced in thickness is impregnated with the molten resin 23 from both surface sides. In FIG. 4, tape-shaped reinforcing fiber bundles 31 disposed at a formation of a plurality of steps are introduced from an entrance positioned at one section of the die 19. Although not shown in FIG. 4, the tape-shaped reinforcing fiber bundles disposed at a formation of a plurality of steps can be introduced into the die from entrances positioned at a plurality of sections, respectively. In such an example, because tape-shaped reinforcing fiber bundles 31 can be introduced into the die at a condition where an adequate gap is given between adjacent tape-shaped reinforcing fiber bundles 31 more surely, such an example is considered to be more preferable.

Respective tape-shaped reinforcing fiber bundles 31 impregnated with the molten resin 23 are laminated in the same die 19. This lamination can be carried out by an appropriate arbitrary method, and in the example shown in FIG. 4, it is performed such that a plurality of fixed guides 33a (squeeze bars) each having a columnar surface are arranged in the running direction of tape-shaped reinforcing fiber bundles 31 so that the columnar outer surfaces come into contact with the tape-shaped reinforcing fiber bundles 31 alternately at positions opposite to each other, and the plurality of the stacked tape-shaped reinforcing fiber bundles 31 are passed in order through the respective fixed guides 33a. By bringing tape-shaped reinforcing fiber bundles 31 being impregnated with the molten resin 23 or having been impregnated with the molten resin 23 into contact with as well as passing them through the fixed guides having such circular surfaces or semi-circular surfaces exemplified later, gaps being narrowed into a wedge-shaped form are formed between the tape-shaped reinforcing fiber bundles 31 and the surfaces of the fixed guides immediately before the contact, and because in these gaps the resin pressure is gradually increased toward the sides of the tape-shaped reinforcing fiber bundles 31, the resin impregnation into the tape-shaped reinforcing fiber bundles 31 is accelerated or supplemented. Namely, on the fixed guides, the acceleration or supplement of resin impregnation as well as the above-described lamination are possible. Further, it is also possible to reduce the thickness of the fiber bundle in the die 19 using such fixed guides. The reduction of the thickness of the fiber bundle due to the spreading and widening of the tape-shaped reinforcing fiber bundle can be carried out at least at one step among steps before and after the introduction into the die, and for the tape-shaped reinforcing fiber bundles 31 reduced in thickness, the resin impregnation in the die 19 and the lamination of the tape-shaped reinforcing fiber bundles 31 impregnated with the resin may be performed.

Figure 5:
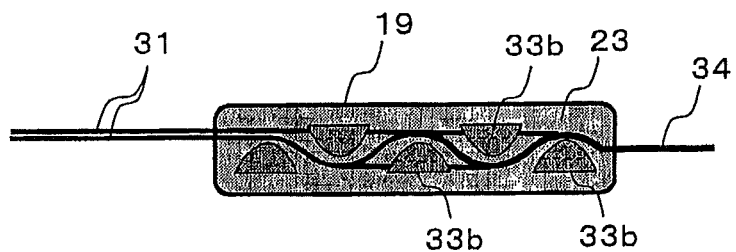
FIG. 5 is a schematic cross-sectional view of a die showing another example of introduction into the die and lamination in the die of tape-shaped reinforcing fiber bundles in a process for producing a sheet-shaped prepreg.

In the example shown in FIG. 5, a plurality of tape-shaped reinforcing fiber bundles 31 reduced in thickness by spreading and widening are introduced into the die 19 supplied with the molten resin 23 at a condition of a multilayer form in the thickness direction of each tape-shaped reinforcing fiber bundle 31 (although observed as a condition of two steps in the state shown in the figure, because the respective steps once are divided and they are again laminated, totally at a formation of four steps). In the example shown in FIG. 5, a plurality of fixed guides 33h (squeeze bars) each having a semi-circular surface are arranged in the running direction of tape-shaped reinforcing fiber bundles 31 so that the semi-circular surfaces face alternately toward opposite directions, the molten resin 23 is impregnated in order into the respective tape-shaped reinforcing fiber bundles 31, and the tape-shaped reinforcing fiber bundles 31 impregnated with the molten resin 23 are laminated in order. Although the fixed guides (squeeze bars) can be any of those each having a columnar surface shown in FIG. 4 and those each having a semi-circular surface shown in FIG. 5, to suppress degradation of the molten resin 23 such as oxidation as less as possible in the above-described die 19, it is preferred to make the amount of the molten resin 23 present in the die 19 minimum. From such a viewpoint, it is considered to be a preferred embodiment to use the fixed guides each having a semi-circular surface not requiring a space and capable of making the capacity of die 19 minimum.

Figure 6:
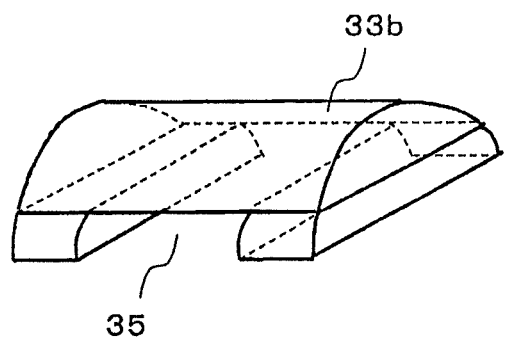
FIG. 6 is a schematic perspective view showing an example of a fixed guide.
Figure 7:
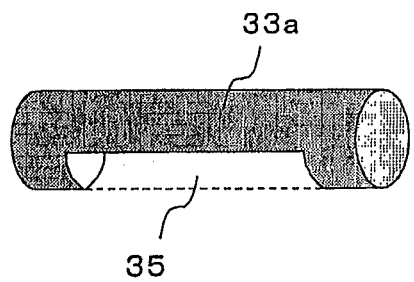
FIG. 7 is a schematic perspective view showing another example of a fixed guide.

To obtain the above-described sheet-shaped prepreg finally ensured at a more uniform resin impregnation condition, it is preferred to perform the resin impregnation into the respective tape-shaped reinforcing fiber bundles 31, the acceleration and supplement of the resin impregnation and the lamination of the tape-shaped reinforcing fiber bundles 31 impregnated with the resin in order in the running direction of the tape-shaped reinforcing fiber bundles 31. For that, it is preferred to arrange the plurality of fixed guides 33b in the running direction of the tape-shaped reinforcing fiber bundles 31 and to specify tape-shaped reinforcing fiber bundles 31 becoming operation targets relative to the arranged respective fixed guides 33b to a part of tape-shaped reinforcing fiber bundles 31 and shift the operation targets in order. For achieving this, it is required that a certain fixed guide 33b operates only for a specified part of tape-shaped reinforcing fiber bundles 31 and allows the remaining tape-shaped reinforcing fiber bundles 31 to merely pass. To satisfy this requirement, for example, as shown in FIG. 6, a tunnel 35 capable of passing a part of tape-shaped reinforcing fiber bundles 31 can be provided to fixed guide 33b. For a columnar fixed guide 33a such as one in the example shown in FIG. 4, similarly the tunnel 35 can be provided as shown in FIG. 7.

Although the laminate of tape-shaped reinforcing fiber bundles 31 impregnated with the molten resin as described above has already a predetermined prepreg form even at a condition pulled from the die 19, in this example, in the post-impregnation step 5, a calendaring treatment is performed by calender rolls 24 equipped with a plurality of rolls. By the pressing from both surface sides by this calendaring treatment, a surer and better resin impregnation becomes possible, and moreover, by a fine adjustment of the pressing pressure in the calendaring treatment, it also becomes possible not only to finely adjust the final thickness and the final width of a sheet-shaped prepreg 34 as a product but also to provide a predetermined concavo-convex shape on the surface of the sheet-shaped prepreg 34. Such an concavo-convex shape exhibits extremely effective advantages not only for a design of the sheet-shaped prepreg, but also for enhancement of an adhesive property when bonded with other parts by exhibiting a physical anchor effect.

Figure 8:
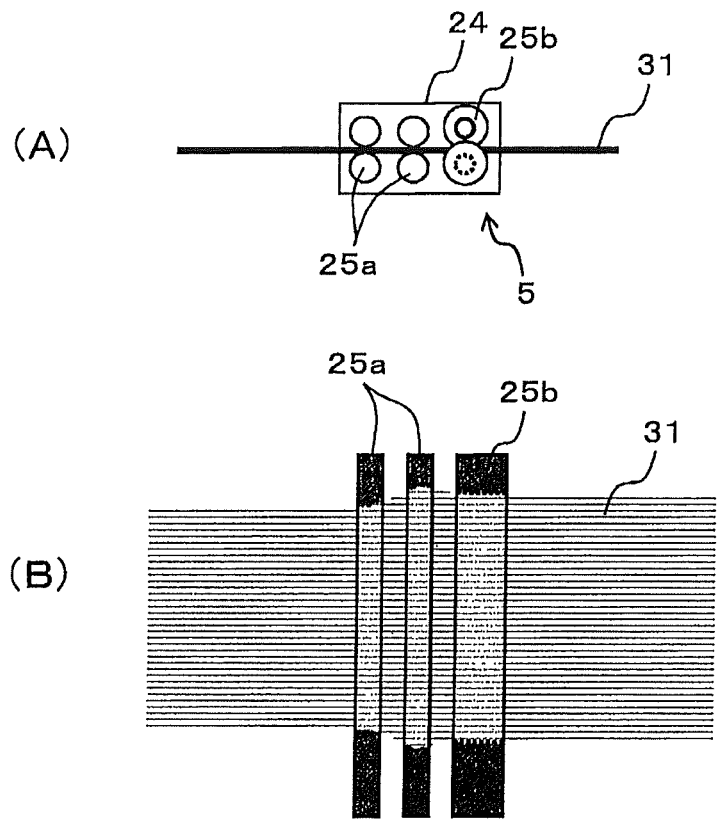
FIG. 8(A) depicts a schematic side view and FIG. 8(B) depicts a schematic plan view showing an example of calendaring treatment in calendar rolls of the apparatus shown in FIG. 1.

With respect to this final width, in the case of controlling further precisely, as shown in FIG. 8, it is preferred that, after the sheet-shaped prepreg is widened by passing it through first calender rolls 25a, the width of the sheet-shaped prepreg is regulated to become a predetermined with in the with direction while narrowing in width the sheet-shaped prepreg, by passing it through a second calender roll 25b (preferably, a roll with a groove having a predetermined width). As described above, by narrowing in width after widening, the width can be controlled at a target width more precisely and stably. Further, a composite material formed from the obtained sheet-shaped prepreg 34 exhibits an effect excellent in quality stability (small in a deviation) of mechanical properties.

In this example, a series of running (conveying) operations of the tape-shaped reinforcing fiber bundles described above are carried out by circulating movements of the upper and lower belts due to a tractor 26. Then, finally, sheet-shaped prepreg 34 as a product is wound as a prepreg roll 29 by a winder 28.

In such process and apparatus for producing the sheet-shaped prepreg according to this example, each of a plurality of tape-shaped reinforcing fiber bundles 10 used for production of the sheet-shaped prepreg 34 as a final product is reduced in thickness by spreading and widening, and the molten resin 23 is impregnated into each tape-shaped reinforcing fiber bundle 31 reduced in thickness from both surface sides in the die 19. Therefore, even in case where a resin having a relatively high melt viscosity such as a thermoplastic resin is used, the resin is impregnated into each of tape-shaped reinforcing fiber bundles 31 sufficiently and satisfactorily in a short time. Then, since resin-impregnated tape-shaped reinforcing fiber bundles 31 each impregnated with the molten resin sufficiently and satisfactorily are laminated by a predetermined number of steps in the same die 19 to form a desired sheet-shaped prepreg 34, the sheet-shaped prepreg 34 can also be kept over the entire at a satisfactory resin-impregnated condition. Further, since each tape-shaped reinforcing fiber bundle 31 reduced in thickness by the spreading and widening of tape-shaped reinforcing fiber bundle 10 is uniformed in thickness at a condition of a small thickness, the arrangement condition of reinforcing fibers 30 in sheet-shaped prepreg 34 as a final product can also be maintained at an excellent uniform condition. Therefore, over the entire of sheet-shaped prepreg 34, a uniform arrangement condition of reinforcing fibers 30 and a satisfactory impregnation condition of resin can be ensured, and desired properties can be achieved over the entire.

Further, by employing a manner wherein the molten resin 23 impregnated into respective tape-shaped reinforcing fiber bundles 31 at a condition where the tape-shaped reinforcing fiber bundles 31 are disposed at a formation of a plurality of steps and a gap is given between adjacent tape-shaped reinforcing fiber bundles 31, with respect to each tape-shaped reinforcing fiber bundle 31, the resin impregnation is performed from both surface sides by a distance (by an impregnation distance) in the direction of the small thickness of the reinforcing, fiber bundle 31 and, therefore, even in case of the molten resin baying a high viscosity, uniform impregnation throughout the whole of the thickness direction can be completed easily in a short time. The difficulty of such an impregnation of the molten resin having a high viscosity into the reinforcing fiber bundle can be explained, for example, using a simple model due to Darcy's law represented by FIG. 9 and the following equation.

Figure 9:
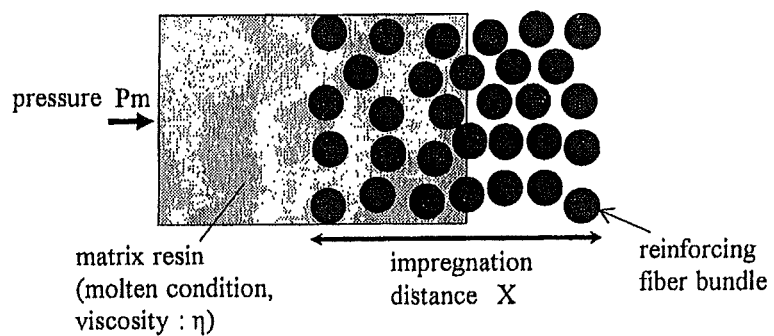
FIG. 9 is an explanation diagram showing a simple model due to Darcy's law in resin impregnation into a reinforcing fiber bundle.

As shown in FIG. 9, when the impregnation distance of the reinforcing fiber bundle is represented as X, the melt viscosity of matrix resin is represented as $\eta$, and a pressure mechanically applied for impregnation of the molten resin is represented as Pm, and a time $t_{imp}$ required for resin impregnation is expressed by being simplified based on Darcy's law, it can be explained by such an equation as $\eta X^2/[2S(Pm+Pc)]$. S represents a parameter relating to permeability, and Pc represents a capillary pressure (it related to wettability). Namely, the time required far resin impregnation is in proportion to melt viscosity $\eta$, the time becomes longer as the melt viscosity $\eta$ becomes higher (namely, becomes harder to impregnate), and it is in proportion to square of impregnation distance X. Since this impregnation distance corresponds to a thickness of each tape-shaped reinforcing fiber bundle 31, it is understood how remarkably it can contribute to shortening of the impregnation time to form tape-shaped reinforcing fiber bundle 10 as tape-shaped reinforcing fiber bundle 31 reduced in thickness by spreading and widening. Thus, since the time required for resin impregnation into each tape-shaped reinforcing fiber bundle 31 can be shortened, and tape-shaped reinforcing fiber bundles 31 each impregnated with resin can be merely laminated in the same die to obtain a desired sheet-shaped prepreg, the time for production of the sheet-shaped prepreg can be considerably shortened, and the productivity can be remarkably enhanced.

Industrial Application

The process and apparatus for producing a sheet-shaped prepreg can be applied to production of any sheet-shaped prepreg using continuous reinforcing fibers and a thermoplastic resin. A sheet-shaped prepreg obtained from such process and apparatus can be suitably used for transportation equipment such as automobiles, airplanes or ships, etc., and structural components and sub-structural components for leisure and sport parts, pressure vessels, structural oil field excavation or civil engineering and architecture, etc.

The invention claimed is:

1. A process for producing a sheet-shaped prepreg comprising:
    a fiber bundle introduction step that arranges tape-shaped reinforcing fiber bundles, each comprising a plurality of continuous reinforcing fibers, wherein the tape-shaped reinforcing fiber bundles are arranged in a multilayer form in a thickness direction of each tape-shaped reinforcing fiber bundle, while running said tape-shaped reinforcing fiber bundles continuously, and introducing them into a die to which a molten thermoplastic resin has been supplied;
    a fiber bundle thickness reduction step that widens each of said tape-shaped reinforcing fiber bundles arranged in said multilayer form by spreading to reduce a thickness of each tape-shaped reinforcing fiber bundle, at one or both of stages before and after said introduction into said die;
    a resin impregnation step that impregnates said molten thermoplastic resin into each of said tape-shaped reinforcing fiber bundles reduced in thickness in said die; and
    a lamination step that laminates a plurality of tape-shaped reinforcing fiber bundles, into which said molten thermoplastic resin is being impregnated, in said die, or that laminates a plurality of tape-shaped reinforcing fiber bundles, into which said molten thermoplastic resin has been impregnated, in said die, and wherein a prepreg having a sheet-shaped shape as its whole shape is produced, and wherein, in said die, respective tape-shaped reinforcing fiber bundles are spread sequentially and respective tape-shaped reinforcing fiber bundles having been impregnated with said molten thermoplastic resin are laminated sequentially, using a plurality of fixed guides arranged in a running direction of said tape-shaped reinforcing fiber bundles, and a tunnel for tape-shaped reinforcing fiber bundles is provided to at least a part of said plurality of fixed guides used for said spreading and said lamination and all of or a part of said tape-shaped reinforcing fiber bundles are run through said tunnel.

2. The process according to claim 1, wherein said tape-shaped reinforcing fiber bundles arranged in said multilayer form are disposed at a formation of a plurality of steps, in which a gap is provided between adjacent tape-shaped reinforcing fiber bundles, in said thickness direction of each tape-shaped reinforcing fiber bundle, at one or both of stages before and after said introduction into said die.

3. The process according to claim 1, wherein each of said tape-shaped reinforcing fiber bundles arranged in said multilayer form is formed by adjoining smaller-width tape-shaped reinforcing fiber bundles to one another in a width direction of each smaller-width tape-shaped reinforcing fiber bundle.

4. The process according to claim 1, wherein a seal section reduces in pressure a chamber of a passageway at a predetermined vacuum level is connected to a portion immediately upstream relative to said fiber bundle introduction step, and a degas step is provided, wherein a pressure reduction level in each of said tape-shaped reinforcing fiber bundles arranged in said multilayer form is enhanced by passing each of said tape-shaped reinforcing fiber bundles arranged in said multilayer form through said chamber of said passageway reduced in pressure at said predetermined vacuum level.

5. The process according to claim 1, wherein, in said fiber bundle thickness reduction step, positions for widening tape-shaped reinforcing fiber bundles adjacent to each other among said tape-shaped reinforcing fiber bundles arranged in said multilayer form by spreading are shifted to each other in a running direction of said tape-shaped reinforcing fiber bundles.

6. The process according to claim 1, wherein, in said resin impregnation step, positions for impregnation or completion of impregnation of said molten thermoplastic resin into respective tape-shaped reinforcing fiber bundles are shifted so as to become positions different from each other in a running direction of said tape-shaped reinforcing fiber bundles.

7. The process according to claim 6, wherein, in said lamination step, a plurality of tape-shaped reinforcing fiber bundles being impregnated with said molten thermoplastic resin or/and having been impregnated with said molten thermoplastic resin are laminated sequentially at positions shifted so as to become positions different from each other in said running direction of said tape-shaped reinforcing fiber bundles.

8. The process according to claim 1, wherein, in said resin impregnation step, impregnation or completion of impregnation of said molten thermoplastic resin into respective tape-shaped reinforcing fiber bundles is performed at a same position in a running direction of said tape-shaped reinforcing fiber bundles.

9. The process according to claim 8, wherein, in said lamination step, a plurality of tape-shaped reinforcing fiber bundles being impregnated with said molten thermoplastic resin or/and having been impregnated with said molten thermoplastic resin are laminated simultaneously at a predetermined position in said running direction of said tape-shaped reinforcing fiber bundles.

10. The process according to claim 1, wherein, in said resin impregnation step or said lamination step, gas and/or resin in said die is ventilated from a degas vent and/or a resin bleed vent provided on said die.

11. The process according to claim 1, wherein a post-impregnation step is provided wherein, after said prepreg laminated in said die and formed as a sheet-like shape as its whole shape is pulled from said die, it is further passed through calender rolls.

12. The process according to claim 11, wherein said calender rolls comprise at least a first calender roll and a second calender roll, at least said second calender roll is a roll with a groove, and after said prepreg formed as a sheet shape is widened by passing it through said first calender roll, a width of said sheet-shaped prepreg is regulated to become a predetermined width in a width direction while narrowing in width said widened sheet-shaped prepreg, by passing it through said second calender roll.

13. The process according to claim 1, wherein said continuous reinforcing fibers comprise carbon fibers.

14. An apparatus for producing a sheet-shaped prepreg having a sheet shape comprising:
 a die supplied with a molten thermoplastic resin;
 a fiber bundle introducer that arranges tape-shaped reinforcing fiber bundles, each comprising a plurality of continuous reinforcing fibers, wherein the tape-shaped reinforcing fiber bundles are arranged in a multilayer form in a thickness direction of each tape-shaped reinforcing fiber bundle, while running said tape-shaped reinforcing fiber bundles continuously, and introducing them into said die;
 a fiber bundle thickness reducer that widens each of said tape-shaped reinforcing fiber bundles arranged in said multilayer form by spreading to reduce a thickness of each tape-shaped reinforcing fiber bundle, at one or both of stages before and after said introduction into said die;
 a resin impregnator that impregnates said molten thermoplastic resin into each of said tape-shaped reinforcing fiber bundles reduced in thickness in said die; and
 a laminator that laminates a plurality of tape-shaped reinforcing fiber bundles into which said molten thermoplastic resin is being impregnated or/and into which said molten thermoplastic resin has been impregnated, in said die, and wherein a plurality of fixed guides are arranged in said die in a running direction of said tape-like reinforcing fiber bundles, said fixed guides being used to spread respective tape-shaped reinforcing fiber bundles sequentially or/and laminate respective tape-shaped reinforcing fiber bundles having been impregnated with said molten thermoplastic resin sequentially, and a tunnel for tape-shaped reinforcing fiber bundles capable of running all of or a part of said tape-shaped reinforcing fiber bundles through said tunnel is provided to at least a part of said plurality of fixed guides.

15. The apparatus according to claim 14, further comprising a guide bar or guide bars to dispose said tape-shaped reinforcing fiber bundles arranged in said multilayer form at a formation of a plurality of steps in which a gap is provided between adjacent tape-shaped reinforcing fiber bundles, in said thickness direction of each tape-shaped reinforcing fiber bundle at one or both of stages before and after said introduction into said die.

16. The apparatus according to claim 14, wherein a seal section reducer in pressure a chamber of a passageway at a predetermined vacuum level and connects to a portion immediately upstream relative to said fiber bundle introducer, and a degasser is provided to enhance a pressure reduction level in each of said tape-shaped reinforcing fiber bundles arranged in said multilayer form by passing each of said tape-shaped reinforcing fiber bundles arranged in said multilayer form through said chamber of said passageway reduced in pressure at said predetermined vacuum level.

17. The apparatus according to claim 14, wherein, in said fiber bundle thickness reducer, positions for widening tape-like reinforcing fiber bundles adjacent to each other among said tape-shaped reinforcing fiber bundles arranged in said multilayer form by spreading are shifted to each other in a running direction of said tape-shaped reinforcing fiber bundles.

18. The apparatus according to claim 14, wherein, in said resin impregnator, positions for impregnation or completion of impregnation of said molten thermoplastic resin into respective tape-shaped reinforcing fiber bundles are shifted so as to become positions different from each other in a running direction of said tape-shaped reinforcing fiber bundles.

19. The apparatus according to claim 18, wherein said laminator comprises a device that laminates a plurality of tape-shaped reinforcing fiber bundles being impregnated with said molten thermoplastic resin or/and having been impregnated with said molten thermoplastic resin sequentially at positions shifted so as to become positions different from each other in said running direction of said tape-shaped reinforcing fiber bundles.

20. The apparatus according to claim 14, wherein said resin impregnator comprises a device that performs impregnation or completion of impregnation of said molten thermoplastic resin into respective tape-shaped reinforcing fiber bundles at a same position in a running direction of said tape-shaped reinforcing fiber bundles.

21. The apparatus according to claim 20, wherein said laminator comprises a device that laminates a plurality of tape-shaped reinforcing fiber bundles being impregnated with said molten thermoplastic resin or/and having been impregnated with said molten thermoplastic resin simultaneously at a predetermined position in said running direction of said tape-shaped reinforcing fiber bundles.

22. The apparatus according to claim 14, wherein a degas vent and/or a resin bleed vent is equipped to said die.

23. The apparatus according to claim 14, wherein a post-impregnator is provided which is disposed at a position downstream relative to said die and which has calender rolls performing calendaring treatment for said prepreg laminated in said die, formed in a sheet shape as its whole shape and pulled from said die.

24. The apparatus according to claim 23, wherein said calender rolls comprise, at least, a first calender roll that widens said prepreg formed as a sheet shape to become a predetermined width in a width direction and a second calender roll with a groove disposed at a position downstream relative to said first calender roll that regulates said widened sheet-shaped prepreg to become a predetermined width in a width direction while narrowing in width said widened sheet-shaped prepreg.

25. The apparatus according to claim 14, configured to arrange tape-shaped reinforcing fibers comprising continuous reinforcing fibers that comprise carbon fibers.

\* \* \* \* \*